Inventor
NEVIN B. SMITH

By Strauch & Hoffman
Attorneys

Dec. 13, 1949 N. B. SMITH 2,490,841
AUTOMATIC WORK CONTROL MEANS
FOR METAL WORKING MACHINES
Original Filed Aug. 8, 1941 3 Sheets-Sheet 3

Inventor
NEVIN B. SMITH

By Strauch & Hoffman
Attorneys

Patented Dec. 13, 1949

2,490,841

UNITED STATES PATENT OFFICE 2,490,841

AUTOMATIC WORK CONTROL MEANS FOR METAL-WORKING MACHINES

Nevin B. Smith, Hamburg, Pa., assignor to Landis Machine Company, Waynesboro, Pa., a corporation of Pennsylvania Original application August 8, 1941, Serial No. 406,049, now Patent No. 2,360,906, dated October 24, 1944. Divided and this application October 21, 1944, Serial No. 559,800

20 Claims. (Cl. 10—91)

This invention relates to automatic work control means for metal working machines, and is more particularly applicable to a multiple or single unit nipple threading machine of the type disclosed in my pending application for patent Serial No. 406,049, filed August 8, 1941, now Patent No. 2,360,906, issued October 24, 1944, and of which the subject matter of the present application is a division.

It is the general object and purpose of the present invention to provide positively operating power driven mechanism for automatically controlling the releasable mounting of work pieces on reciprocating work carriages whereby the work piece may be accurately positioned relative to spaced cutting tools for operation upon different parts of the work piece.

It is another object of the invention to provide a work holding and releasing device associated with each of the spaced cutting tools with means for reciprocating said devices relative to each other including a common power driven control member, and means operatively connected with said control member for operating said work holding and releasing devices in properly timed relation to their reciprocating motions to hold the work piece for movement therewith relative to the threading tool, or to release said work piece.

It is an additional object of the invention to provide work transfer mechanism connected with and operated by said power driven control member whereby the work piece is automatically delivered to a work holder or is transferred from one reciprocating carriage to the other in properly timed relation with the reciprocating motions of said carriages and with the operation of said work holding and releasing devices.

It is a still further object of my invention in one embodiment thereof to provide fluid pressure operated means for actuating the reciprocatory work holding device to work holding and releasing position and to provide means for controlling the fluid pressure supply actuated by means operatively connected with a part of the power driven means for reciprocating said device.

It is also the general aim and purpose of the present invention to provide a work control mechanism as above characterized which embodies comparatively few cooperating parts of simple structural form, assembled in a compact organization which may be readily applied to standard types of nipple threading or other metal working machines at reasonable cost, to materially increase the utility and serviceability thereof.

With the above and other objects in view, the invention comprises the improved work control means for metal working machines, and the construction and relative arrangement of the several parts thereof, as will be hereinafter more fully described, illustrated in the accompanying drawings and subsequently incorporated in the subjoined claims.

In the drawings wherein I have shown one simple and practical embodiment of my invention and in which similar reference characters indicate corresponding parts throughout the several views:

Figure 5 is a detail fragmentary vertical section showing a portion of one of the reciprocating carriages with the work holding device mounted thereon.

Figure 1:
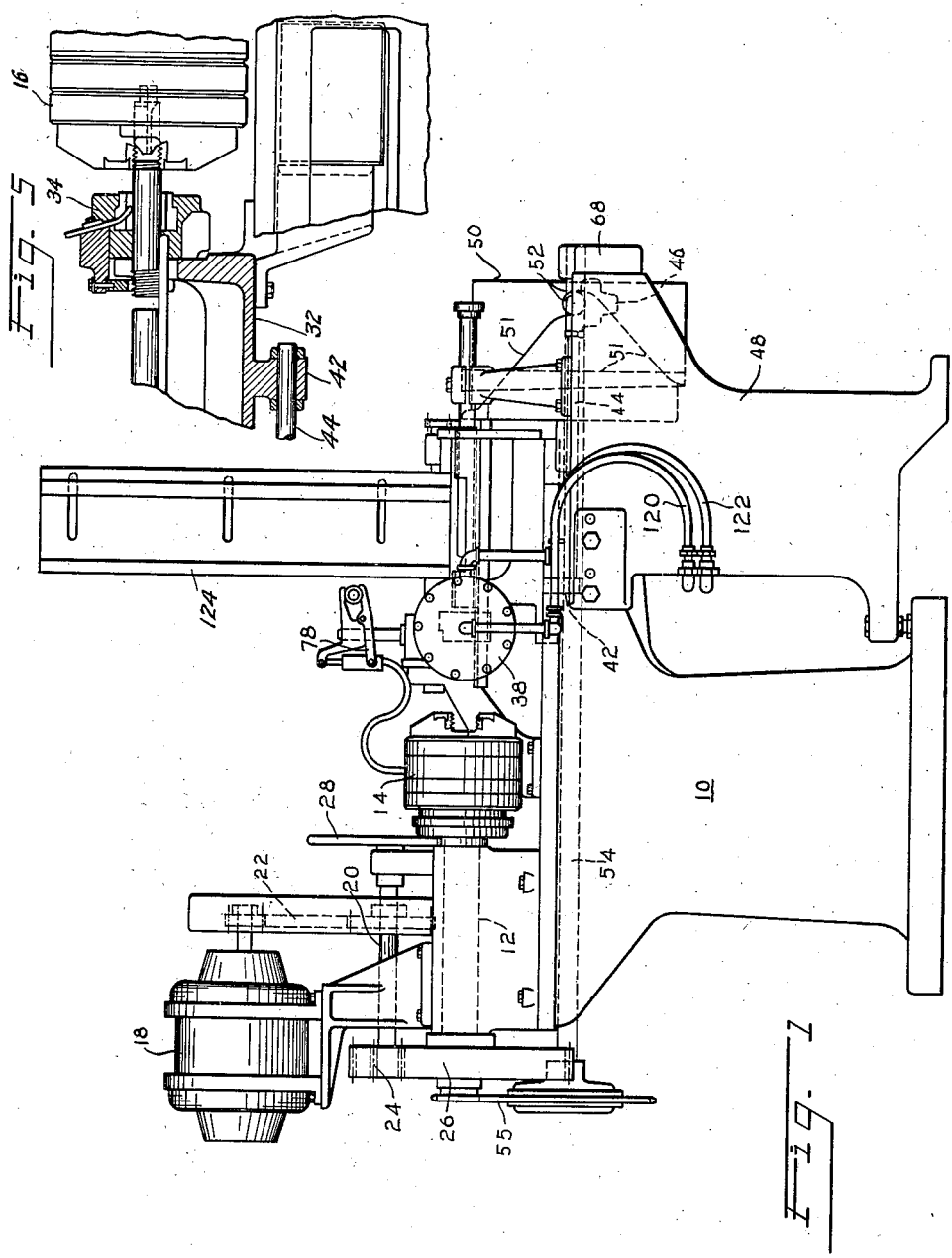
Figure 1 is a side elevation illustrating one practical embodiment of my invention as applied to a multiple-die nipple threading machine.

Referring to Figure 1 of the drawings, I have illustrated my invention as applied to a nipple threading machine having a suitable supporting frame structure 10 upon which spaced apart horizontal spindles, one of which is illustrated at 12, are journalled in suitable bearing means. The spindles 12 are provided at their forward ends with cutting tools, as generally indicated at 14 and 16, respectively, said tools in this instance comprising screw threading die heads of conventional construction. The two spindles may be driven from any convenient power source, but for this purpose, I have shown a suitable motor 18 mounted upon the machine frame and having its shaft connected with the countershaft 20 by the driving chain 22. One end of the latter shaft is provided with the pinion 24 having driving engagement with gears 26 fixed to the rear ends of the tool spindles. If desired, a hand wheel 28 may be secured to the forward end of countershaft 20 to rotate the gears manually for the purpose of checking the operation of the machine during various phases thereof.

Figure 2:
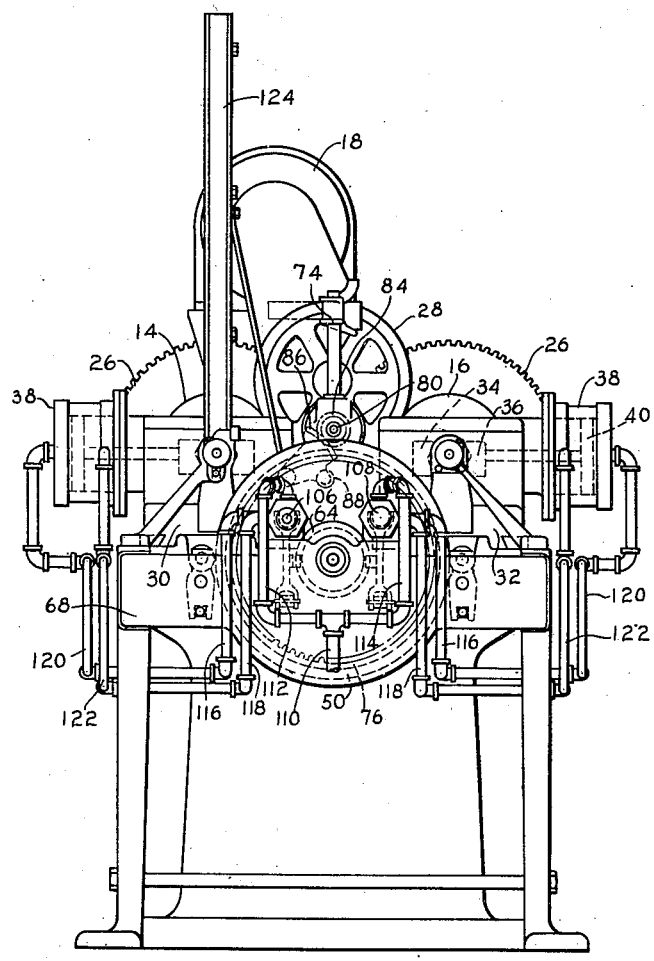
Figure 2 is a front end elevation thereof.

In the machine frame and in cooperatively associated relation with the cutting tools 14 and 16, respectively, the work carriages indicated at 30 and 32, respectively, are mounted for reciprocating movement on the usual slide-ways. Each of these carriages, upon the end thereof, which is opposed to the cutting tool or die head, is provided with a work holding and releasing device, which, as shown in Figure 2, includes a stationary jaw member 34 and a movable jaw member 36. The latter jaw member is actuated by a fluid motor 38 having a piston 40 with which said jaw member is connected. The jaws 34 and 36 of each work holder are adapted to engage the opposite sides of a work-piece positioned between the same to securely clamp and rigidly hold the work-piece with its axis in alignment with the axis of rotation of the cutting tool or die head 14 or 16. The means for automatically controlling the operation of the fluid motors 38 in the reciprocation of the work carriages will be later described.

The means for positioning the work piece in the work holder and for displacing the work piece therefrom and supporting said work piece, with respect to the work holder and carriage, is fully described in my co-pending application, above identified. Since this feature constitutes no essential part of the present invention it will not be herein described in further detail. Also the specific means for relatively reciprocating the work carriages 30 and 32 is fully described in said pending application and will not be herein set out in detail. For the purpose of this explanation, the following description of the power operated means whereby such reciprocatory motion is imparted to the work carriages will suffice.

Referring to Figure 1, each work carriage has a depending lug 42 connected by a rod 44 to a slide member 46 mounted in an auxiliary frame 48 which is attached to the main frame 10 of the machine. Between these slide members a control drum 50 is located and is formed upon its peripheral surface with suitable cam means 51 cooperating with rollers, indicated at 52, on said slide members and controlling the reciprocatory motions of the respective work carriages in timed relation with each other.

Figure 3:
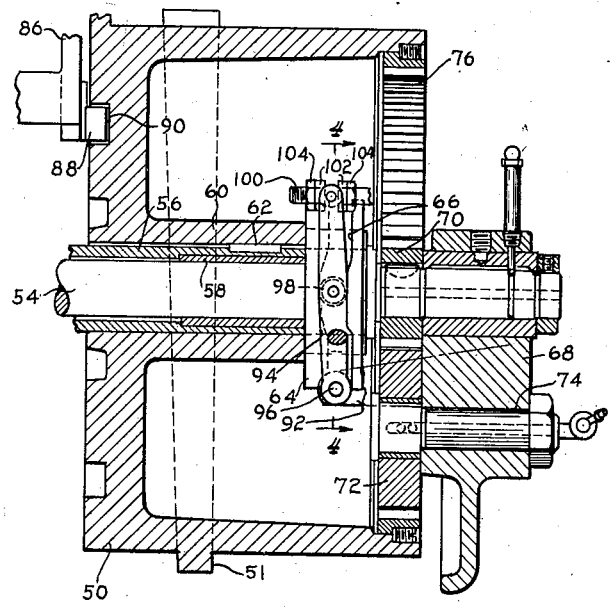
Figure 3 is a vertical sectional view through the control drum for the reciprocating work carriages and illustrating the means for operating the control means for the fluid operated motors actuating the work holding devices.

Referring now to Figures 1 and 3 of the drawings, the drive shaft 54 is connected at its rear end by the chain and sprocket or other power transmitting connection 55 with the spindle 12 of one of the rotary cutting tools. A tubular shaft 56 surrounds the shaft 54 and is supported for rotation relative thereto by suitable bearing sleeves 58 as shown in Figure 3. The carriage control drum 50 is formed with an internal hub 60 which is keyed or otherwise rigidly fixed as at 62 to one end of the tubular shaft 56. This end of said shaft terminates in, or has secured thereto, an enlarged cylindrical head 64 abutting the end of the hub 60, said head being provided in its periphery with a cam track 66 for a purpose to be presently explained. The drive shaft 54 has a reduced rear end extending beyond the drum 50 and journalled in a suitable bearing in the fixed part 68 of the frame 48. Upon this end of the drive shaft, a pinion 70 is keyed or otherwise fixed and is in constant mesh with the gear 72 journalled upon the stud shaft 74 fixed in the frame part 68, said gear in turn meshing with the internal gear 76 fixed to the rear end of the control drum 50. Thus it will be understood that rotation is transmitted through the drive shaft 54 to the carriage control drum at a reduced speed relative to the speed of rotation of the cutting tools 14 and 16.

Between the spaced reciprocating work carriages, a work transfer device, generally indicated at 78 in Figure 1 of the drawings is mounted. The specific construction of this transfer device and the operating mechanism therefor forms the subject matter of another divisional application and is fully disclosed in the parent application above identified, to which reference may be had for a further detail understanding thereof. As shown in Figure 2 of the drawings, the operating mechanism for this transfer device includes the oscillatory drive shaft 80 journalled in a suitable bearing on a fixed part of the frame 48 at the rear of the carriage control drum 50. To this shaft the gear 84 is fixed in meshing engagement with the teeth of the gear segment 86 suitably mounted on the fixed frame part of the machine. This gear segment carries the roller 88 cooperating with the cam track 90 formed in the rear end wall of the carriage control drum 50. Thus it will be apparent that the work transfer device 78 will be operated by said control drum in timed relation with the reciprocatory motion of the work carriages 30 and 32.

Figure 4:
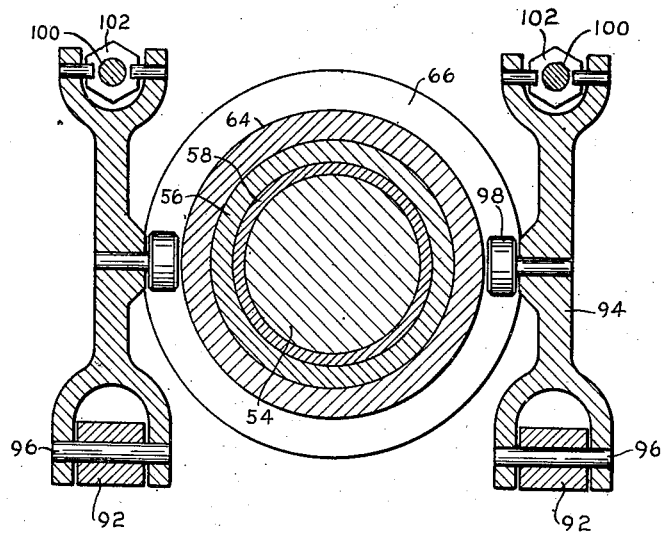
Figure 4 is a transverse sectional view taken substantially on the line 4—4 of Figure 3.

Referring to Figures 3 and 4 of the drawings, at each side of the cam 64, a bracket arm 92 fixed to or integrally formed with the frame member 68 is positioned. To each of these bracket arms, the lower end of a follower 94 is pivotally connected as at 96. Intermediate of its ends, each follower carries a roller 98 engaged in the cam track or groove 66 of cam 64 so that in the rotation of the tubular shaft 56 the followers 94 will be oscillated in accordance with the particular configuration of the cam track 66.

The upper end of each follower arm 94 is adjustably connected to a valve stem 100 by means of adjusting nuts 102 and lock nuts 104. These valve stems are connected with valves 106 and 108, respectively, which control the supply of pressure fluid to motors 38 for the operation of the work holding and releasing devices on the carriages 30 and 32, respectively.

As shown in Figure 2 of the drawings, high pressure fluid is supplied through the pipe line 110 and branch pipes 112 and 114 to the control valves 106 and 108, respectively. Each of said valves controls the supply of pressure fluid through the pipe lines 116 and 118, including flexible pipe sections 120 and 122, to the cylinder of one of the motors 38 at opposite sides of the piston 40 therein. Thus it will be understood that in the oscillation of the follower arms 94, the control valves 106 and 108 are actuated to supply high pressure fluid to the respective motors and operate the work clamping or holding devices to securely hold the work-piece on the respective carriages in accurate relation to the respective rotary cutting tools 14 and 16 and to release the work-piece after the same has been operated upon by said tools, in timed relation with the reciprocatory motions of the respective carriages 30 and 32.

As fully described in my original application, in the operation of the above mechanism, the work pieces are singly fed from a magazine shown at 124, to the reciprocating carriage 30. Assuming that a work piece, held by the work holder on this carriage in accurate coaxial relation with the rotary cutting tool 14, has been threaded or otherwise operated upon at one of its ends by said tool, at the end of such operation, a suitable trip mechanism (not shown) withdraws the cutting elements from contact with the work piece. In the reverse or retracting movement of the carriage 30, control valve 106 is operated to admit high pressure fluid through pipe lines 116, 122 to the inner end of the motor cylinder mounted on said carriage, thereby operating the movable element 36 of the work holder to release the work piece. In the further retracting movement of the carriage the work piece is disengaged from the holder and is supported in a stationary position in the manner shown in my pending application.

The transfer device 78 is now operated by the control drum 50 to pick up the semi-finished work piece and transfer the same with its unfinished end in opposed relation to the other rotating tool or die head 16 and deposit the same on supporting means on the carriage 32 in accurate axial alignment with said cutting tool, as seen in Figure 2.

In the meantime, as shown in Figure 5, a work piece has been completely finished by the tool 16 and, in the retracting movement of the carriage 32, the movable element 36 of the work holder thereon is actuated by the operation of control valve 108 to release the work-piece which is then discharged from the machine by the newly transferred semi-finished work-piece on the carriage. Further retracting movement of the carriage 32 positions the semi-finished work-piece in the work holder and control valve 108 is then operated to actuate movable member 36 and secure the work piece in fixed relation to the carriage. Thereupon movement of the carriage 32 is reversed by the control drum 50 and in the advancing movement the other end of said work-piece is threaded or otherwise operated upon by the rotary cutting tool 16.

The above described cycle of operations is repeated to accurately thread or cut the opposite ends of the work-pieces in rapid succession.

It will be noted from the above description that the operating means for the work carriages as well as the operating means for the work holding and releasing devices thereon and the operating means for the work transfer device are all connected with and operatively controlled by a common driving shaft 54 which derives its driving power from the same motor or power source which drives the cutting tools 14 and 16. Therefore the several instrumentalities will be positively operated in accurately co-related timed relation to each other, as well as to the cutting or threading operation of the tools 14 and 16. By the provision of a single power driven shaft for operating the several individual work controlling mechanisms it will be appreciated that I have materially simplified and increased the operating efficiency of multiple-unit metal working machines of this type; that the means for establishing an operative connection between said controlling mechanisms and the power driven shaft comprises a minimum number of elements of simple structural form which will be positive, efficient and reliable in functional operation; and that my present improvements are readily applicable to multiple or single unit metal working machines designed for performing various kinds of cutting or forming operations on work-pieces, without necessitating any radical change in the construction of such machines at comparatively low additional cost.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a metal working machine having two work forming devices, a work holding device associated with each forming device, and means for simultaneously operating said holding devices to feed a work piece to the associated forming device and to retract the same therefrom, said means including a power operated member common to both of the work holding devices and having means controlling the feeding and retracting movement of one of said devices in alternating relation to the corresponding movements of the other work holding device.

2. The combination defined in claim 1, in which said control member and the work forming devices are operated from a common power source in timed relation to each other.

3. In a metal working machine having a plurality of work forming devices and power driven means for operating said devices, a work feeding and retracting carriage associated with each of said devices, a driving shaft operatively connected with a part of said power driven means, and means for simultaneously transmitting feeding and retracting movements to said carriages in alternating relation to each other and in timed relation to the operation of said forming devices, said means including a common control member directly coacting with means connected to each carriage, and speed reduction gearing operatively connecting said member with said driving shaft.

4. The combination defined in claim 3, together with a work holding and releasing device on each carriage, and means connected to and operable in synchronism with said carriage control member for actuating said work holding and releasing devices.

5. In a metal working machine having a plurality of work forming devices, a work feeding and retracting device associated with each of said forming devices, means controlling the actuation of said work feeding and retracting devices in timed relation to each other, including a common power operated member, and means for transferring a work piece from one of said feeding and retracting devices to another comprising a work carrier operatively connected with and actuated by said power operated member in timed relation with the feeding and retracting movements of said devices.

6. The combination defined in claim 5, in which each work feeding and retracting device comprises a work holding and releasing member, and wherein means operatively connected with said power operated member actuates said work holding and releasing members in timed relation with the feeding and retracting movements of the respective devices.

7. In a metal working machine having a plurality of work forming devices, a work holding device associated with each forming device and including a movable work holding and releasing member, means for simultaneously operating said holding devices to feed a work piece to the associated forming device or to retract the same therefrom, comprising a rotatable power operated member common to said work holding devices and having means controlling the feeding and retracting movements of the respective devices in timed relation with each other, and means including an actuating member connected to and rotating in unison with said power operated member to actuate the work holding and releasing members of the respective work holding devices in timed relation with the feeding and retracting movements of said devices.

8. The combination defined in claim 7, in which said actuating member is mounted in fixed coaxial relation with the power operated member.

9. The combination defined in claim 7, in which said actuating member is provided with cam means for synchronizing the actuation of the work holding and releasing members with the operation of said control member.

10. The combination defined in claim 7, in which an operating motor is provided for each work holding and releasing member, and said actuating member is provided with means controlling the energization of said motors.

11. In a metal working machine having a work forming device, a work holding device associated with said forming device, power operated means for actuating said forming device, a driving shaft operatively connected with a part of said power operated means, means for operating said work holding device to feed a work-piece to the forming device and to retract the same therefrom, including an independently rotatable control member, and means operatively connecting said member with the driving shaft to rotate said member at relatively low speed and actuate the work holding device in timed relation to the operation of said work forming means.

12. In a metal working machine having a work forming device, a work holding and releasing device associated with said forming device, power operated means for actuating said forming device, a driving shaft operatively connected with a part of said power operated means, means for operating said work holding device to feed a work-piece to the forming device and to retract the same therefrom, including an independently rotatable control member, means operatively connecting said member with the driving shaft to rotate said member at relatively low speed and actuate the work holding device in timed relation to the operation of said work forming means, and means operatively connected with said control member and actuated in synchronism therewith to control the work holding and releasing device in timed relation with its feeding and retracting movements.

13. In a metal working machine having a work forming device, a work holding and releasing device associated with said forming device, power operated means for actuating said forming device, a driving shaft operatively connected with a part of said power operated means, means for operating said work holding and releasing device to feed a work-piece to the forming device and to retract the same therefrom; including an independently rotatable control member, and means operatively connecting said member with the driving shaft to rotate said member at relatively low speed and actuate the work holding device in timed relation to the operation of said work forming means, a fluid motor for operating said work holding and releasing device to hold and release the work, control means for said motor; and means operatively connected with said rotatable control member for actuating said motor control means in timed relation with the feeding and retracting movements of said work holding and releasing device.

14. The combination defined in claim 13, in which said rotatable control member comprises a drum having external cam means, and said last named means comprises a cam member mounted within the drum in fixed relation thereto.

15. The combination defined in claim 13, in which said rotatable control member comprises a cam drum fixed to a tubular shaft surrounding said driving shaft, and said last named means comprises a cam member fixed to said tubular shaft within the drum.

16. The combination defined in claim 11, together with a work carrier for delivering a work piece to the work holding device, and means operatively connecting said carrier to the rotatable control member for actuation thereby in timed relation to the feeding and retracting movements of said work holding device.

17. In a metal working machine having a work forming device, a work holding device having relatively movable parts associated with said forming device, means including a member continuously operable in one direction for bodily moving said work holding device to feed a work-piece to the forming device and to retract the same therefrom, and additional means operatively controlled by a part of said last named means to actuate said work holding device in timed relation to the feeding and retracting movements of said device relative to the work forming device.

18. The combination defined in claim 17, wherein said means for bodily moving the work holder includes a rotatable control member, and said additional means comprises a cam in fixed coaxial relation with said control member.

19. The combination defined in claim 17, in which said additional means includes a fluid motor operatively connected with a part of said work holding device.

20. In a metal working machine having a work forming device, a work holding device including a movable work holding and releasing member, means for reciprocating said holding device to feed a work-piece to the forming device and retract the same therefrom, said means comprising a cam member controlling the feeding and retracting movements of said work holding device, and means for actuating said movable work holding and releasing member including an actuating element connected to and operable with said cam member.

NEVIN B. SMITH.

REFERENCES CITED

The following references are of record in the file of this patent:

UNITED STATES PATENTS

| Number | Name | Date |
|---|---|---|
| 590,463 | Plopper | Sept. 21, 1897 |
| 658,396 | Phillips | Sept. 25, 1900 |